(12) United States Patent
Endo

(10) Patent No.: US 8,230,834 B2
(45) Date of Patent: Jul. 31, 2012

(54) HOLLOW POPPET VALVE AND METHOD OF MANUFACTURING THE SAME

(75) Inventor: Hiromitsu Endo, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 647 days.

(21) Appl. No.: 12/516,963

(22) PCT Filed: Oct. 10, 2008

(86) PCT No.: PCT/JP2008/068498
§ 371 (c)(1),
(2), (4) Date: May 29, 2009

(87) PCT Pub. No.: WO2010/041337
PCT Pub. Date: Apr. 15, 2010

(65) Prior Publication Data
US 2011/0186000 A1    Aug. 4, 2011

(51) Int. Cl.
*F02N 3/00* (2006.01)
*B21K 1/20* (2006.01)
(52) U.S. Cl. .................................. 123/188.3; 29/888.45
(58) Field of Classification Search ............... 123/188.2, 123/188.3, 188.4, 79 R; 29/888.01, 888.4, 29/888.45, 888.451, 888.452, 888.453
See application file for complete search history.

(56) References Cited

U.S. PATENT DOCUMENTS

| | | |
|---|---|---|
| 5,458,314 A | 10/1995 | Bonesteel |
| 6,263,849 B1 | 7/2001 | Bonesteel et al. |
| 6,912,984 B2 | 7/2005 | Narasimhan et al. |
| 2004/0261746 A1 | 12/2004 | Narasimhan et al. |
| 2007/0241302 A1 | 10/2007 | Kishihara et al. |

FOREIGN PATENT DOCUMENTS

| | | |
|---|---|---|
| EP | 0619419 A1 | 3/1994 |
| EP | 1070831 A2 | 1/2001 |
| EP | 1462621 A1 | 9/2004 |
| JP | 02-020411 Y2 | 6/1990 |
| JP | 06-299816 A | 10/1994 |
| JP | 2789390 B2 | 8/1998 |

(Continued)

OTHER PUBLICATIONS

International Search Report of PCT/JP2008/068498, Mailing Date of Nov. 11, 2008.

(Continued)

*Primary Examiner* — Noah Kamen
(74) *Attorney, Agent, or Firm* — Westerman, Hattori, Daniels & Adrian, LLP

(57) ABSTRACT

A hollow poppet valve has a stem portion provided at one end thereof with a tip portion; a cap portion; and a flared fillet portion formed between the stem portion and the cap portion, wherein at least a part of the stem portion that connects to the fillet portion is a thin hollow cylindrical member, and the cap member is welded to the fillet portion. The cap member is thin and has an arcuate axial cross section. It is laser-beam welded to the seat-abutment portion formed at the open end of the fillet portion such that a weld bead is formed along the inner periphery of the interface of the mated ends of the members. The weld bead adds an extra weld depth to the weld, which increases the modulus of section of the welded regions of the cap member and the fillet portion and enhances their welding strength.

8 Claims, 8 Drawing Sheets

FOREIGN PATENT DOCUMENTS

| | | |
|---|---|---|
| JP | 2000-045730 A | 2/2000 |
| JP | 2001-059408 A | 3/2001 |
| JP | 2001-234714 A | 8/2001 |
| JP | 2004-301124 A | 10/2004 |
| JP | 2006-097498 A | 4/2006 |
| JP | 2006-274917 A | 10/2006 |
| JP | 2007-285186 A | 11/2007 |
| JP | 2008-088815 A | 4/2008 |
| JP | 2008-138649 A | 6/2008 |
| WO | 00/47876 A1 | 8/2000 |

OTHER PUBLICATIONS

Japanese Statement and Amendment filed in Japanese Patent Office on Jun. 1, 2009.

|  | First Specification | Second Specification |
|---|---|---|
| Diameter of Flared Portion | φ 30.5 mm | φ 36 mm |
| Outer Diameter of Stem | φ 505 mm | φ 5.5 mm |
| Total Length | 100 mm | 130 mm |
| Volume of Hollow Section | 3.1 cc | 4.2 cc |
| Weight | 23 g | 31 g |
| Thickness of Stem Portion (t1) | 0.65 mm | 0.65 mm |
| Thickness of Tip Portion (t2) | 1 mm | 1 mm |
| Thickness of Fillet Portion (t3) | 1.2 mm | 1.2 mm |
| Thickness of Seat-abutment portion (t4) | 1 mm | 1 mm |

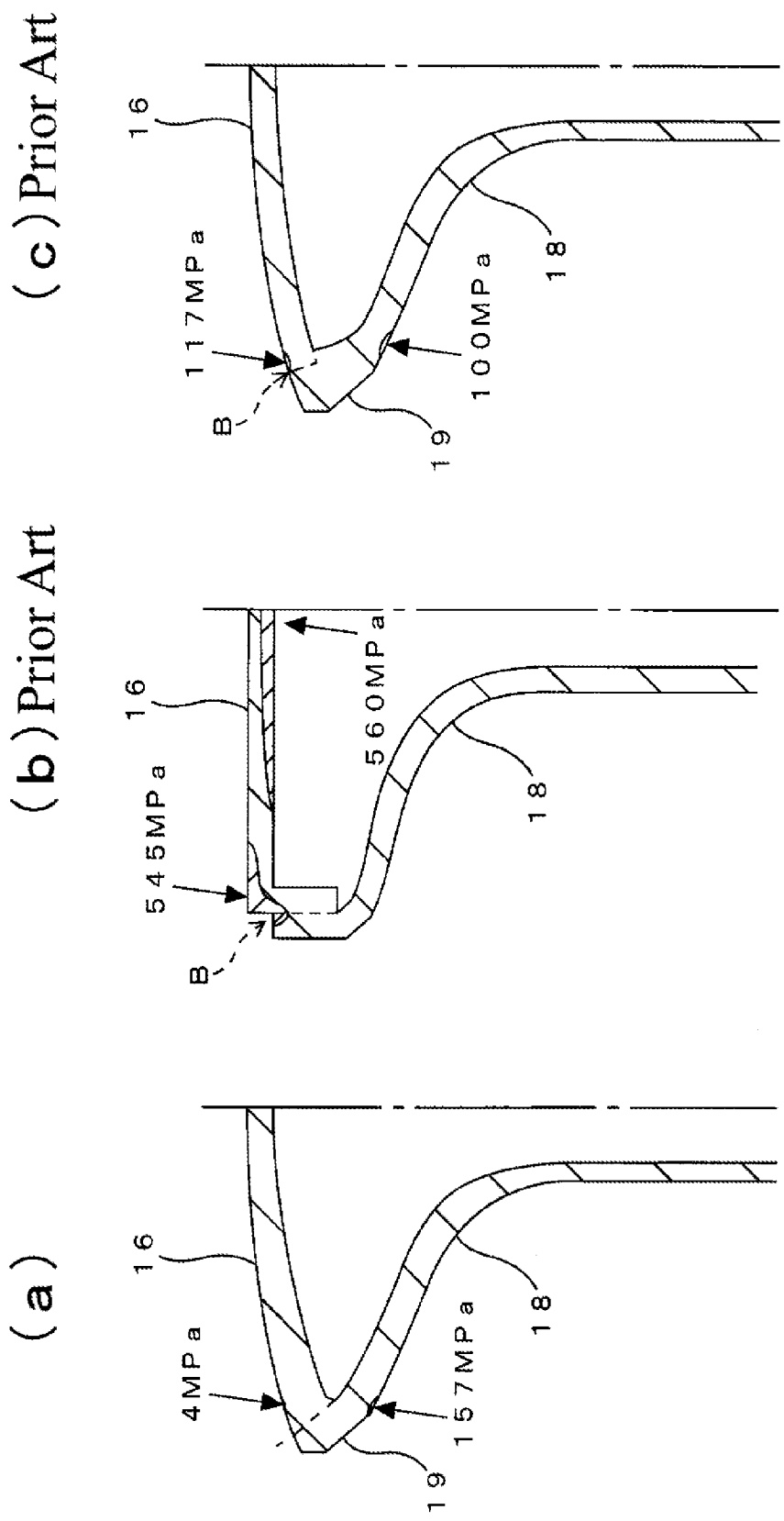

HOLLOW POPPET VALVE AND METHOD OF MANUFACTURING THE SAME

TECHNICAL FIELD

This invention relates to a light-weight hollow poppet valve for use with an internal combustion engine, the valve having: a stem portion provided at one end thereof with a tip portion; a cap portion for receiving combustion pressure; and a transitional flared fillet portion provided between the stem portion and the cap portion, and, more particularly, to a thin hollow cylindrical poppet valve having a thin hollow cylindrical member comprising of a fillet portion and a stem portion integral with the fillet portion, with a cap member, serving as the cap portion, welded to the fillet portion. The invention also relates to a method of manufacturing such poppet valve.

BACKGROUND OF THE INVENTION

JPA Laid Open No. H6-299816 (FIGS. 2, 7, 8, 10-12) and Re-published patent WO 00/47876 (FIGS. 2, 13) cited below disclose hollow poppet valves and methods of manufacturing the same, in which a metal plate is drawn to form an integral thin hollow cylindrical stem portion which has an upper flared fillet portion having an open end and a lower closed tip portion. A disk-shaped cap is welded to the peripheral open end of the fillet portion. Poppet valves of both JPA Laid Open No. H6-299816 and Re-published patent WO 00/47876 are light in weight since their stem portion, tip portion, and fillet portion are fabricated in the form of an integral thin hollow cylindrical member.

SUMMARY OF THE INVENTION

However, the poppet valve disclosed in JPA Laid Open No. H6-299816 suffers a problem that the hardness of the surface of the seat-abutment portion, formed on the fillet portion, is decreased by welding heat due to the fact that the seat-abutment portion is formed closely to the open end thereof welded to the cap member. Moreover, in the embodiments shown in FIGS. 2, 7, 8, and 10 of JPA Laid Open No. H6-299816 suffer another problem that the caps are thick and therefore heavy, which is an obstacle to reduce the weight of the poppet valve. In view of such disadvantages of the poppet valves, Re-published patent WO 00/47876 discloses a structure of a poppet valve in which a cap is thin and a fillet portion is thick only in the region near its open peripheral end where a seat-abutment portion 2 is formed, so that the poppet valve has a good weight-strength characteristic and a good anti-welding-heat characteristic (for preventing the seat-abutment portion from losing its surface hardness).

However, since the poppet valve of Re-published patent WO 00/47876 (shown in FIGS. 2 and 13) has such a thick open edge of the fillet portion as mentioned above, it has less weight alleviation effect. Moreover, the structure shown in FIG. 2 of Re-published patent WO 00/47876 requires a process of fabricating a stepped or depressed portion for receiving the cap in the open periphery of the fillet portion, which adds a further manufacturing cost to the poppet.

This invention aims to overcome the prior art problems as mentioned above. It is, therefore, an object of the invention to provide a cost-effective hollow poppet valve having a good weight-strength characteristic, the poppet valve comprising: a fillet portion having a seat-abutment portion and an open periphery; and a cap portion welded to the seat-abutment portion, both portions configured such that welding heat applied thereto will not adversely affect the surface of the seat-abutment portion and that the two portions will maintain high rigidity (mechanical strength) if they are formed thin.

It is another object of the invention to provide a method of manufacturing such hollow poppet valve.

To attain the object above, there is provided in accordance with one aspect of the invention a hollow poppet valve for use with an internal-combustion engine, the hollow poppet valve including: a stem portion having at one end thereof a closed tip portion; a cap portion consisting of a disk-shaped member for receiving combustion pressure; and a thin hollow cylindrical member having a flared fillet member which is integral with the stem portion and welded to the cap member to serve as a transitional region between the stem portion and the cap portion, the thin hollow poppet valve characterized in that:
the thin hollow cylindrical member, drawn from a metal plate, has a thickness in the range of 0.5-2 mm, for example, which is not more than the initial thickness of the metal plate;
the cap member has
a thickness substantially equal to the maximum thickness of the fillet portion,
a generally arcuate axial cross section, and
a tapered outer peripheral face;
the fillet portion is provided near the open end thereof with a seat-abutment portion formed with a tapered inner peripheral face to be mated with, and laser/electron-beam welded to, the tapered outer peripheral face of the cap member; and
a weld bead is formed along the inner periphery of the interface of the welded cap member and the fillet portion.

A method of manufacturing a hollow poppet valve of the invention having: a stem portion having at one end thereof a closed tip portion; a cap portion consisting of a disk-shaped member for receiving combustion pressure; and a flared fillet portion which is integral with the stem portion to form a thin hollow cylindrical member and welded to the cap member to serve as a transitional region between the stem portion and the cap portion the method characterized by comprising steps of:

drawing a metal plate into a thin hollow cylindrical member of a thickness (for example in the range of 0.5-2 mm, which is not more than the initial thickness of the metal plate) such that the thin hollow cylindrical member is provided near the open end of its fillet portion with a seat-abutment portion having a tapered inner peripheral face;

forming a cap member having a thickness substantially equal to the maximum thickness of the fillet portion, an axially arcuate cross section, and a tapered outer peripheral face to be mated with the tapered inner peripheral face of the seat-abutment portion;

mating the tapered outer peripheral face of the cap member with the tapered inner peripheral face of the seat-abutment portion; and laser-beam welding or electron-beam welding the mated faces so as to form a weld bead along the inner periphery of the mated faces.

(Function)

In laser-beam welding or electron-beam-welding, a beam used is narrow in width (in the range of 0.1-0.2 mm for example) that the width of the weld region (lying in the direction perpendicular to the interface of the jointed faces) is small and that welding is performed at high energy density in an extremely short period of time. As a consequence, the influence of welding heat on the surface of the seat-abutment portion is irrelevant (that is, welding heat does not decrease the hardness of the surface of the seat-abutment portion).

In this invention, the cap portion has substantially the same thickness as the maximum thickness of the fillet portion, and the at least the transitional region of the hollow poppet valve that includes the fillet portion and the stem portion is formed to have a thickness in the range of 0.5-2 mm. Accordingly, the hollow poppet valve has a small weight. The structure of an inventive cap member (or fillet portion) is simple in that it has no step for receiving the fillet portion (or cap member) as provided in the prior art poppet valves (as disclosed in JPA Laid Open No. H6-299816 and Re-published patent WO 00/47876), so that the inventive poppet valve can be manufactured in a simple manner and at a lower cost.

It is noted that the cap portion has an arcuate axial cross portion, which provides the cap with sufficient rigidity (mechanical strength) against combustion pressure.

It is noted that each of the cap member and the seat-abutment portion is provided at the outer periphery thereof with an outwardly protruding portion of an excess thickness (17a and 19a of FIG. 3, the portion hereinafter referred to as excess-thickness portion) surrounding the interface of the mated faces. As a laser/electron beam L, directed towards the inner periphery of the interface of, and along the interface of, the mated faces of the cap member and the seat-abutment portion, is irradiated inwardly from outside the outer peripheries, regions of the mated cap member and the seat-abutment portion in the vicinity of the interface are fused, thereby welding the mated faces. Then, the fused regions tend to flow (or move) inwardly along the interface of the mated faces and towards the inner periphery of the interface, which results in depression of the fused excess-thickness portions 17a and 19a, and results in inward bulging of the cap member and the fillet portion along the inner periphery of the interface for the same amount as the depressed excess-thickness portions), thereby resulting in a weld bead as shown in FIG. 3(b).

The weld bead formed along the inner periphery of the interface of the jointed faces of the cap member and the fillet portion adds extra weld depth to the mated faces welded, which enhances the mounting strength of the cap member (cap portion), and, helped by the axially arcuate configuration of the cap portion, facilitates enhancement of the modulus of section of the transitional regions of the cap portion and the fillet portion, thereby increasing the rigidity (mechanical strength) of the entire hollow valve.

It is noted that the thin hollow cylindrical member may be formed as an integral member that include the fillet portion, stem portion, and tip portion. Alternatively, the thin hollow cylindrical member may be formed as an integral member that includes the fillet portion and stem portion and is welded at the open end of stem portion with a disk-shaped tip member. Further alternatively, the thin hollow cylindrical member may be formed to integrally include a fillet portion and a part of the stem portion which is jointed at the open end thereof to a solid member serving as the remainder of the stem portion and the tip portion.

The thickness of the cap member of the hollow poppet valve may be gradually increased with the radius thereof.

By so configuring the cap member, the rigidity (mechanical strength) of the cap portion is enhanced on one hand against combustion pressure, and the joint strength of the cap member is increased on the other hand, since the axial extent of the interface of the jointed mating faces of the cap member and the fillet portion, as well as the weld depth (of the jointed portion), is then increased. In addition, the modulus of section of the transitional regions of the cap portion and the fillet portion is increased, and so is the rigidity (mechanical strength) of the entire hollow valve.

The seat-abutment portion and the cap member of the hollow poppet valve may be welded together by means of a laser/electron beam directed along the interface and offset from the interface into the cap member by a given offset distance.

Irradiated with the laser beam or electron beam in this way, regions of the cap member and seat-abutment portion across the interface of the mated faces will be fused and welded together in such a manner that the fused regions are offset away from the surface area of the seat-abutment portion to the cap member by the offset distance. As a consequence, the width of the fused region is smaller in the seat-abutment portion than in the cap member, thereby decreasing the influence of the welding heat on the surface of the seat-abutment portion.

In forming the hollow poppet valve, a circular planar surface, perpendicular to the axis of the stem portion, may be formed on the backside of, and along the periphery of, the cap member.

By forming such planar surface on the backside periphery of the cap member, the width (or axial extension) of the outer peripheral face of the cap member becomes shorter than the width (or axial extension) of the inner peripheral face of the seat-abutment portion. This provides the following merits.

First, the interface of the cap member and the seat-abutment portion then has a narrower (or shorter) axial extension, so that the heat capacities of the regions to be irradiated and fused by the laser beam are reduced accordingly. Thus, the irradiated regions become more fusible in a shorter irradiation time.

Second, a space having a vertically triangular cross section is formed between the circular planar surface extending along the backside periphery of the cap member and the inner peripheral face of the seat-abutment portion, which space can accepts fused metals diffusing from the fused regions thereinto to form the above-described circular weld bead. This weld bead fills the backside triangular space along the outer periphery of the cap member, compensating for the shortened weld depth of the jointed faces.

Third, in mating the cap member to the inner peripheral face of the seat-abutment portion, the circular planar surface of the cap member is advantageous to prevent the cap member from interfering the root portion (or axially curved end) of the seat-abutment portion. If the outer peripheral face of the cap member had the same width (axial extension) as the inner peripheral face of the seat-abutment portion, instead of having a shorter axial extension, the outer peripheral backside edge of the cap member would interfere with the root end of the seat-abutment portion when mated to the seat-abutment portion due to the fact that the seat-abutment portion is inclined at about 45 degrees relative to the fillet opening (which is inclined at about 90 degrees with respect to the axis of the stem portion and extends substantially horizontally), so that the cap member would not be properly mated to the seat-abutment portion.

The present invention can provide an exceedingly cost-effective hollow poppet valve which has a seat-abutment portion of a desired surface hardness and a better strength-weight characteristic than conventional ones.

The invention can also provide a process of easily manufacturing such hollow poppet valve.

The rigidity (mechanical strength) of the cap portion as well as the fillet portion can be enhanced in accordance with the invention to thereby further enhance the strength-weight characteristic of the poppet valve.

Accordance to the invention, the hollow poppet valve may have a configuration in which the surface of the seat-abutment portion is less susceptive to the welding heat, so that the seat-abutment portion may secure an enhanced surface hardness.

The heat capacities of the regions across the interface of the mated cap member and the seat-abutment portion can be reduced in accordance with the invention, so that the welding time for the mated faces can be reduced accordingly.

It is noted that in the invention the cap member can be smoothly placed in position and mated to the seat-abutment portion so that the cap member can be accurately and quickly welded to a predetermined position of the fillet portion.

BRIEF DESCRIPTION OF THE DRAWINGS

FIG. 3(a) shows in cross section the position of a laser beam for irradiating the mated faces of the fillet portion and the cap member, and the regions thereof to be fused and welded by the beam; and FIG. 3(b) shows in cross section the regions welded.

FIG. 7 shows specifications of poppet valves in accordance with the first embodiment.

FIG. 8 compares an FEM-analysis performed on a poppet valve of the first embodiment, with the FEM-analyses performed on the poppet valves of JPA Laid Open No. H6-299816 and Re-published patent WO 00/47876.

DETAILED DESCRIPTION OF THE INVENTION

Figure 1:
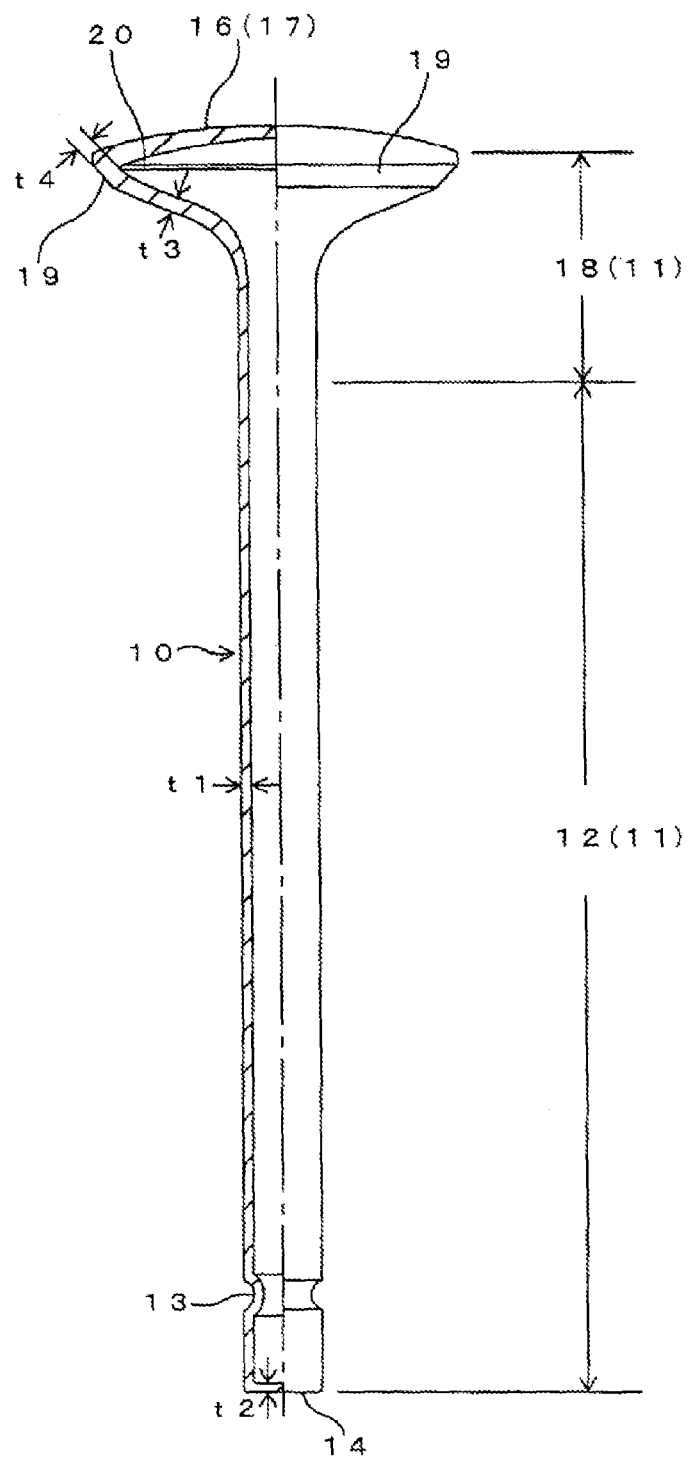
FIG. 1 shows a side elevation, partly in cross section, of a hollow poppet valve in accordance with the first embodiment of the invention.
Figure 2:
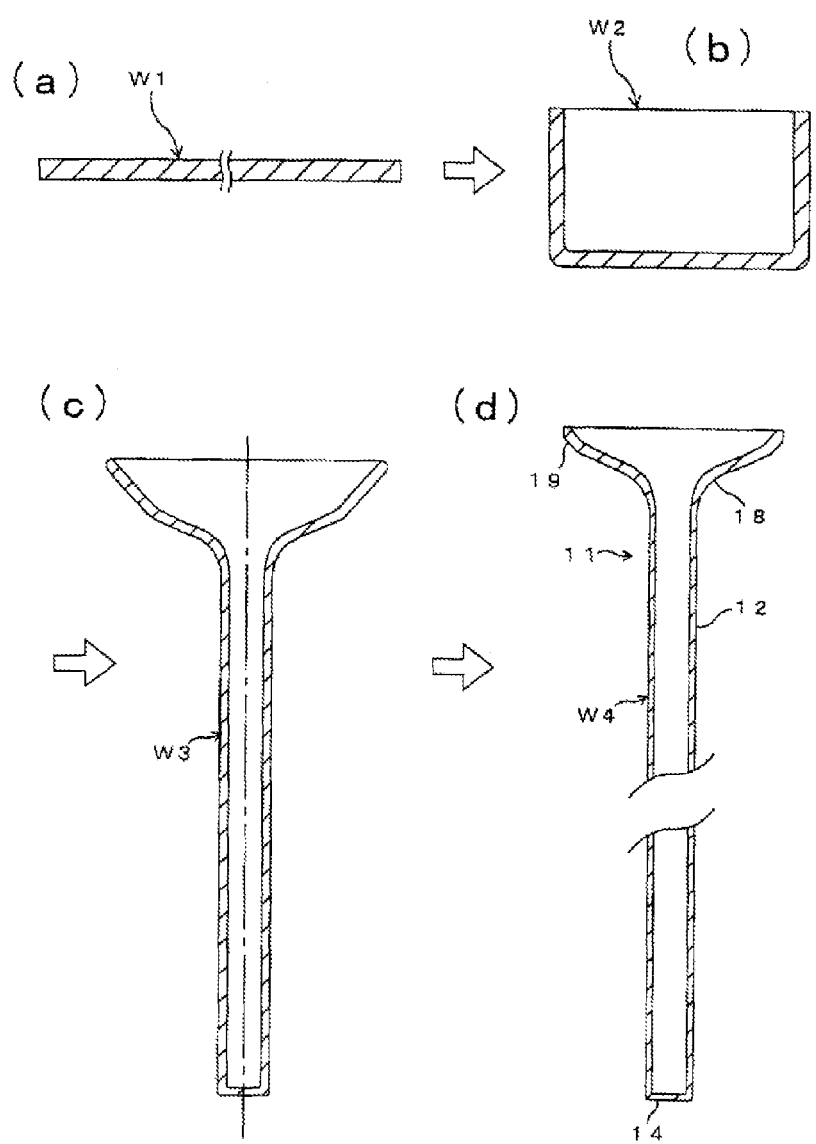
FIGS. 2(a)-(d) are diagrams showing a process for forming a thin hollow cylindrical member that constitutes a poppet valve.
Figure 3:
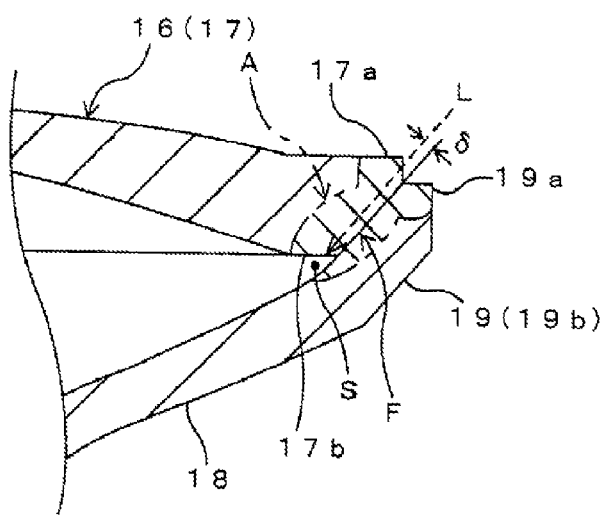
FIG. 3 illustrates a process of welding a cap member to the inner face formed on the peripheral open end of a fillet portion of the thin hollow cylindrical member. Particularly.
Figure 3:
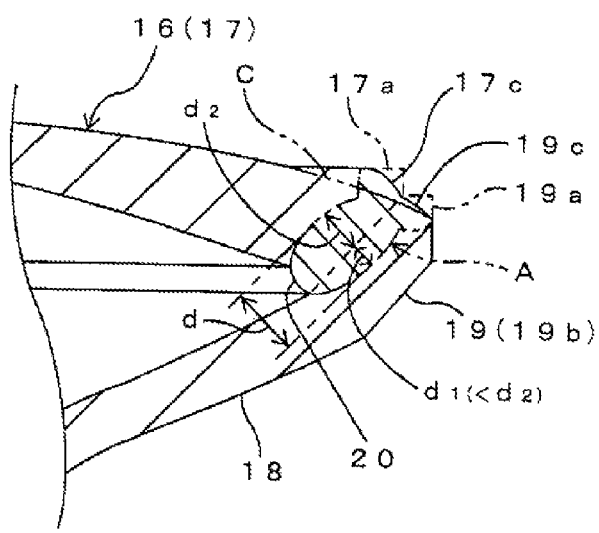

The invention will now be described in detail by way of example with reference to the accompanying drawings in which:

FIGS. 1-3 show a hollow poppet valve for use with an internal combustion engine in accordance with a first embodiment of the invention. More particularly, FIG. 1 is a side elevation, partly in cross section, of the hollow poppet valve; FIGS. 2(a)-(d) are figures illustrating a process of forming a thin hollow cylindrical member of the poppet valve shown in FIG. 1;

FIG. 3 is a diagram illustrating a process of welding a cap member to the inner peripheral face of the open end of the fillet portion of the thin hollow cylindrical member, with FIG. 3(a) showing in cross section the regions of the fillet portion and the cap member near the interface thereof to be mated, irradiated, and fused by a laser beam, and FIG. 3(b) showing in cross section the condition of the regions welded.

In these figures, reference numeral 10 indicates a thin hollow poppet valve including: a stem portion 12 having a tip portion 14 to close its lower end; a cap portion 16 for receiving combustion pressure; and a flared fillet portion 18 serving as a transitional region between the stem portion 12 and the cap portion 16. The fillet portion 18, stem portion 12, and tip portion 14 constitute an integral thin hollow cylindrical member 11. The cap portion 16 consists of a thin disk-shaped cap member 17 welded to the inner peripheral face of the fillet portion 18 of the thin hollow cylindrical member 11.

Formed near the open end of the fillet portion 18 is a seat-abutment portion 19 inclined at 45 degrees with respect to the axis of the stem portion 12. Formed near the lower end of the stem portion 12 is a Cotta slot 13.

The thin hollow cylindrical member 11 is formed from a 1.2 mm thick metal plate for example by drawing and pressing the metal plate into an integral object W4 having a thickness in the range of 0.65-1.2 mm, through intermediate steps for forming objects W1-W3. The resultant object is integral with the fillet portion 18 and has a closed tip portion 14. Specifically, the cylindrical stem portion 12 has a constant wall thickness t1 of 0.65 mm, and the tip portion 14 has a constant bottom thickness t2 of 0.8 mm. The thickness of the fillet portion 18 increases radially outwardly and has a maximum thickness t3 of 1.2 mm. The seat-abutment portion 19 has a constant thickness t4, which measures 1.0 mm in the axial direction.

On the other hand, the cap portion 16 (cap member 17) is press-formed, for example, to have a vertically arcuate or curved configuration, to ensure that this the cap portion acquires high rigidity (mechanical strength) against combustion pressure. At the same time the outer peripheral face of the cap member 17 is tapered so that it can be fitted in position on the tapered inner peripheral face of the seat-abutment portion 19. The inner peripheral face of the seat-abutment portion 19 and the outer peripheral face of the cap member 17 are mated and laser-beam-welded to form a weld bead 20 along the inner periphery of the interface of the welded regions of the seat-abutment portion 19 and the cap member 17.

Like the thin hollow cylindrical member 11, the cap portion 16 (cap member 17) is also formed thin, in such a way that the central section of the cap portion 16 has the same thickness as the maximum thickness of the fillet portion 18, and the thickness gradually increases with the radius of the cap until it becomes about 3 mm thick at the periphery. Thus, the rigidity (mechanical strength) of the cap member is enhanced against the combustion pressure it receives.

It is noted that the gradual increase in thickness of the cap member 17 in the radial direction increases the axial extension, and hence the weld depth, of the face of the cap member 17 to be welded to the fillet portion 18 as shown in FIG. 3(a), thereby enhancing the joint strength of the cap member 17. At the same time, the modulus of section of the transitional region of the valve 10 from the cap member 16 to the fillet portion 18 is increased, which in turn enhances the rigidity (mechanical strength) of the entire hollow poppet valve 10.

Although the thickness t4 of the seat-abutment portion 19 to which the cap member 17 is welded is 1.0 mm, which is thinner than the maximum thickness t3 (1.2 mm) of the fillet portion 18, the influence of the welding heat on the surface of the seat-abutment portion 19 is irrelevant due to the fact that, first, the beam diameter of the laser beam is extremely small in the range of 0.1-0.2 mm, second, the width of the welded regions across the interface F of the mated faces is as narrow as about 0.5 mm as shown in FIG. 3(b), and third, welding is instantly performed with a high energy beam.

Further, since the laser beam L (FIG. 3(a)) is directed along the interface F and inwardly offset by a small distance δ (delta) (in the range of 0.05-0.3 mm for example) from the interface F of the mated faces into the cap member 17, the welding heat has less influence on the surface of the seat-abutment portion 19.

That is, when the regions A, of width d say, of the cap member 17 and seat-abutment portion 19 across the interface F of the mated faces are fused and welded by means of the laser beam L which is inwardly offset into the cap member 17 by a distance δ (delta) from the outer surface 19b of the seat-abutment portion 19 as shown in FIG. 3(a), the fused regions A are offset from the interface by the distance δ. As a result, the width d1 of the fused region of the seat-abutment portion 19 is smaller than the width d2 of the fused region of the cap member 17 (d1<d2), so that the welding heat has less influence on the outer surface 19b of the seat-abutment portion 19. Thus, a desired surface hardness of the outer surface 19a of the seat-abutment portion 19 is secured.

Moreover, as the laser beam L is directed along the interface F, regions A of the cap member 17 and the seat portion 19 across the interface F are fused, welded, and move inwardly along the interface F. As a consequence, the excess-thickness portions 17a and 19a (FIG. 3(a)), formed along and extending radially outwardly from the respective outer peripheries of the mated cap member 17 and seat-abutment portion 19, are depressed, as indicated by 17c and 19c in FIG. 3(b). As a consequence, the same amount of the fused regions A as the excess-thickness portions depressed is extruded out of the inner periphery of the interface F to form a weld bead 20.

After the welding is done, the outer peripheries of the respective cap member 17 and seat-abutment portion 19, including the residual excess-thickness portions 17a and 19a, are machined to make the surface of the cap member 17 have a smooth and predetermined curvature as indicated by "C".

As described previously, the weld bead 20, formed along the inner periphery of the interface F of the jointed faces of the cap member 17 and the fillet portion 18 (of the seat-abutment portion 19), adds extra weld depth to the welded faces, thereby increasing the mounting strength of the cap member 17 to the fillet portion 18. At the same time, in collaboration with the cap portion 16 having a vertically curved cross section, the weld bead 20 also increases the modulus of section of the region that extend from the cap portion 16 to the fillet portion 18, thereby enhancing the rigidity (mechanical strength) of the entire hollow poppet valve 10.

Formation of a circular planar surface 17b along the backside periphery of the cap member 17 shortens the width (or axial extension) of the outer peripheral face of the cap member 17 less than the width (or axial extension) of the inner peripheral face of the seat-abutment portion 19, as shown in FIG. 3(a). This configuration provides the following merits.

First, the cap member 17 and the seat-abutment portion 19 then share a narrower interface F and therefore have smaller regions across the interface F to be irradiated by the laser beam L. Since the regions have smaller heat capacities, the regions become fusible in a shorter irradiation time.

Second, a vertical acute-angled space S (FIG. 3(a)) is formed between the circular planar surface extending along the backside periphery of the cap member 17 and the inner peripheral face of the seat-abutment portion 19, and a part of the regions A fused by the laser beam L is extruded into the space to form the weld bead 20. The weld bead 20 filling the space S tends to increase the weld depth of the welded faces. Thus, the weld bead supplements the narrowed width (i.e. axial extension) of the once narrowed interface F of the cap member 17 and the seat-abutment portion 19.

Third, when the cap member 17 is mated to the inner face of the seat-abutment portion, the circular planar section can avoid the cap member 17 from interfering the root section of the seat-abutment portion 19 (where the seat-abutment portion of the fillet portion begins). The reason for this can be seen as follows. When the outer peripheral face of the cap member 17 and the inner peripheral face of the seat-abutment portion 19 are designed to have the same width (axial extension), it would happen that, in mating the outer peripheral face of the cap member 17 to the inner peripheral face of the seat-abutment portion 19, the lower periphery of the cap member 17 could touch and interfere the root section of the seat-abutment portion 19 due to the fact that the seat-abutment portion 19 extends at about 45 degrees with respect to the opening of the fillet portion 18 which is substantially perpendicular to the axis of the stem portion 12. Then, the cap member would fail to be properly mated in position on the inner peripheral face. This can happen especially when these faces had some metrication errors (for example, when the outer diameter of the lower periphery of the cap member 17 turns out to be smaller than the corresponding inner diameter of the seat-abutment portion 19.

In contrast, the cap member 17 of the present invention will not interfere the fillet portion 18, because the width (axial extension) of the outer peripheral face of the cap member 17 is definitely shorter than that of the inner peripheral face of the seat-abutment portion 19.

Next, referring to FIG. 2, a process of manufacturing the hollow poppet valve 10 in accordance with the first embodiment will now be described.

First, as shown in FIG. 2(a)-(b), a blank metal plate W1 is cold-pressed to form a cup-shaped object W2, which is annealed as needed. The cup-shaped object W2 is further cold-drawn to form the fillet portion 18 and the stem portion 12 using transfer presses, as shown in FIG. 2(c)-(d). By press-forming the open periphery of the fillet portion 18 of the object W2, subsequent objects W3 and W4 are formed. The object W4 has a fillet portion 19 of predetermined dimensions. In the cold drawing process as shown in FIG. 2(c)-(d), a mandrel may be used as needed. Although annealing is not needed in principle, intermediate annealing may be applied to these objects if they are too hard for cold drawing.

Next, a Cotta slot 13 is formed on the circumference of the lower end portion of the stem portion 12 of the object W4 by means of a roll forming process, for example. This completes formation of the thin hollow cylindrical member 11.

Finally, the cap member 17, fabricated from a metal plate independently of the cylindrical member 11, is laser-beam welded to the inner peripheral face of the seat-abutment portion 19 of the fillet portion 18 of the cylindrical member 11. Then the excess-thickness portions 17a and 19a are machined to make the surface of the cap portion 16 smooth and desirably curved.

Figure 4:
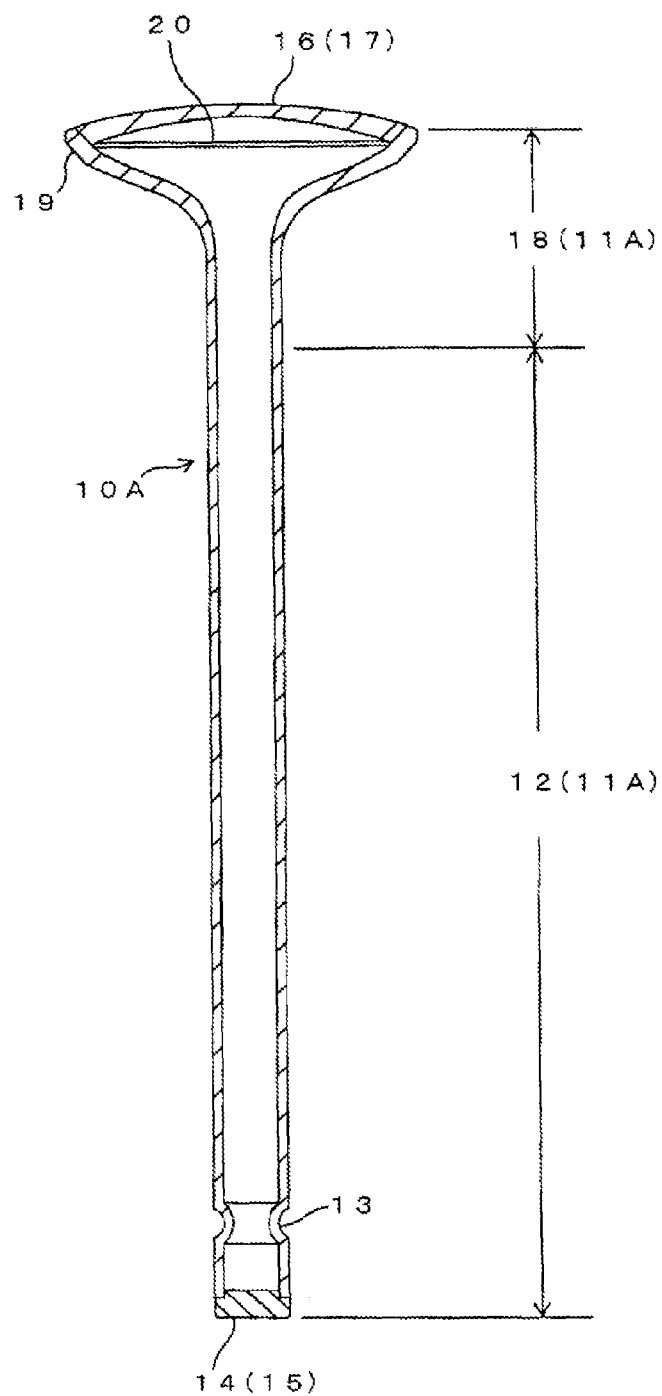
FIG. 4 shows a vertical cross section of a hollow poppet valve in accordance with a second embodiment of the invention.

FIG. 4 shows a longitudinal cross section of a hollow poppet valve 10A in accordance with a second embodiment of the invention.

In contrast to the hollow poppet valve 10 of the first embodiment in which the fillet portion 18, stem portion 12, and tip portion 14 are formed as an integral part of a thin hollow cylindrical member 1, a thin hollow cylindrical member 11A of the hollow poppet valve 10A of this embodiment is formed of a stem portion 12 which is integral with the fillet portion 18, but the fillet portion 18 does not include the tip portion 14. This thin hollow cylindrical member 11A is obtained by cutting the stem portion 12 of the thin hollow cylindrical member 11 of the first embodiment to a predetermined length to remove the tip portion 14.

In forming the hollow poppet valve 10A, a tip member 15 is welded to the lower end of the cut stem portion 12 and by laser-beam welding the cap member 17 to the opening of the fillet portion 18.

Other features of the second embodiment are the same as those of the first described above, and not repeated here. Like reference numerals in the two embodiments refer to like elements.

Figure 5:
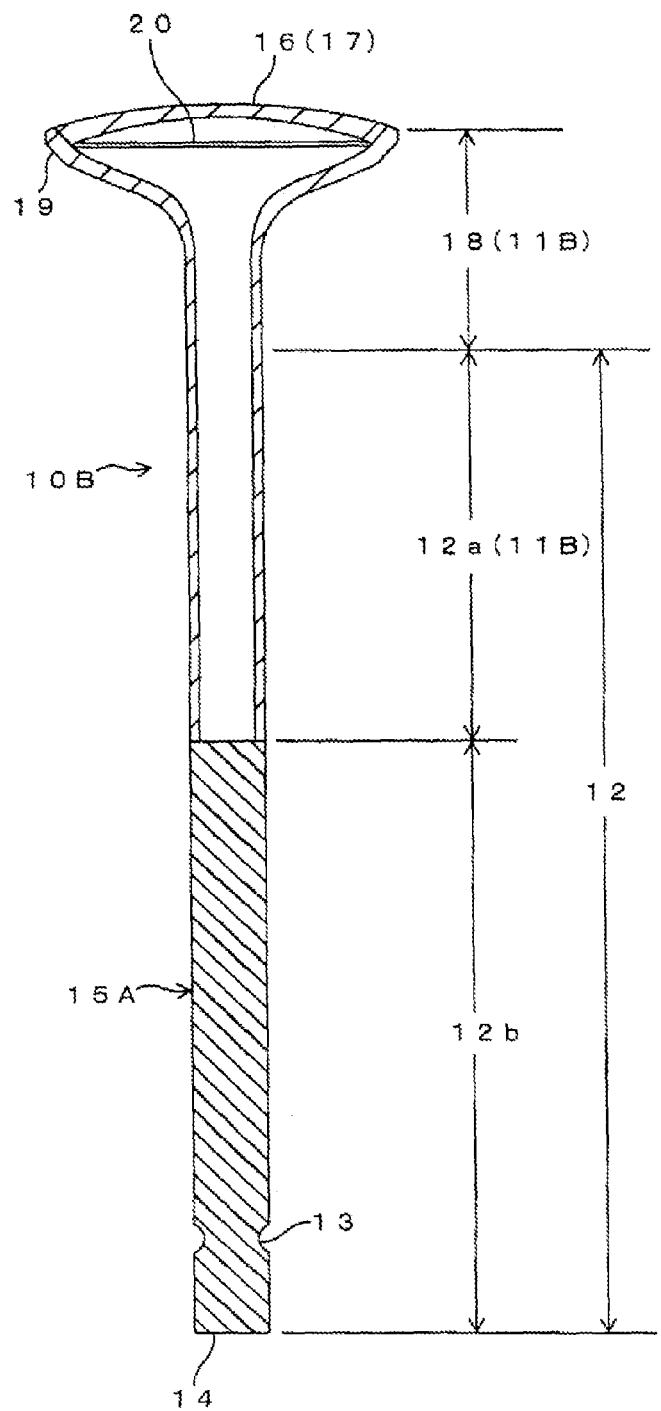
FIG. 5 shows a vertical cross section of a hollow poppet valve in accordance with a third embodiment of the invention.

In the second embodiment, the length of the thin hollow cylindrical member 11A can be controlled with high precision that the fabrication yield of the hollow poppet valve 10A is high. FIG. 5 shows a longitudinal cross section of a hollow poppet valve in accordance with the third embodiment of the invention.

The thin hollow cylindrical member 11B of the hollow poppet valve 10B of the third embodiment consists of a fillet portion 18 and an upper half section 12a of the stem portion 12, in which a solid rod 15A constituting the lower half section 12b of the stem portion 12 and the tip portion 14 is integrally jointed (by means of friction welding for example) to the stem portion 12a of the cylindrical member 11B, and a cap member 17 is laser-beam welded to the open end of the fillet portion 18.

Other features of the third embodiment are the same as those of the first described above, and will not be further described. Like reference numerals refer to like elements in the two embodiments.

Figure 6:
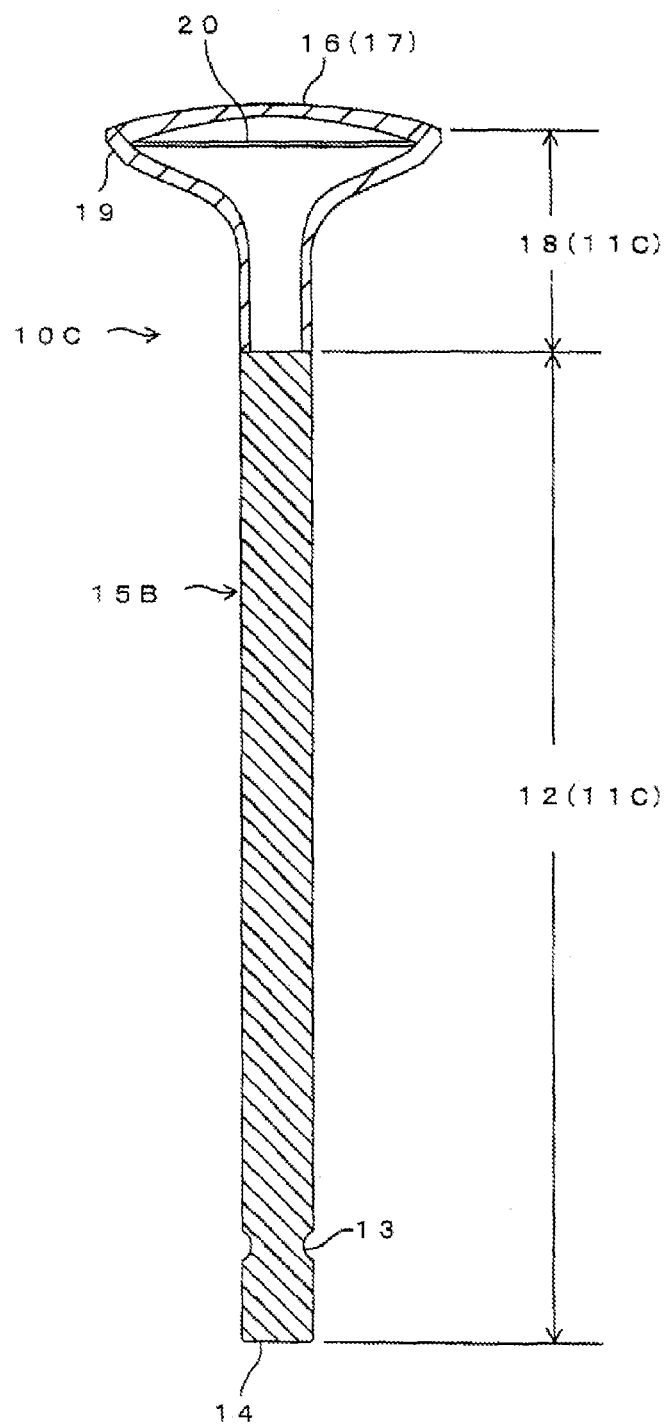
FIG. 6 shows a vertical cross section of a hollow poppet valve in accordance with a fourth embodiment of the invention.

FIG. 6 shows a longitudinal cross section of a hollow poppet valve 10C in accordance with a fourth embodiment of the invention.

In the fourth embodiment shown herein, the thin hollow cylindrical member 11C consists of only a fillet portion 18, which is jointed at the lower end (as viewed in FIG. 6) thereof to a solid rod 15B that constitutes a stem portion 12 and a tip portion 14, by means of friction pressure welding for example. A cap member 17 which serves as a cap portion 16 is laser-beam welded to the open end of the fillet portion 18.

Other features of the fourth embodiment are the same as those of the first described above, and further details of the embodiment will be omitted. Like elements will be referred to by like reference numerals in the both embodiments.

The hollow poppet valves 10B and 10C of the third and fourth embodiments, respectively, shown in FIGS. 5 and 6 are heavier than the hollow poppet valve 10A of the second embodiment. However, fabrication yields of these hollow poppet valves 10B and 10C are higher, since the total length of these hollow poppet valves can be well controlled to the same length.

Prototype poppet valves 10 in accordance with the first embodiment were manufactured by first forming a thin hollow cylindrical member 11 and a cap member 17 from a blank metal plate of SUS3005 and SUS 436 or SUS430, and by integrally laser-beam-welding them together. FIG. 7 shows two specifications of these poppet valves. FIG. 8 compares result of FEM analysis of a poppet valve 10 of the invention with those of JPA Laid Open No. H6-299816 and Re-published patent WO 00/47876. More particularly, FIG. 8(a) shows the result of the FEM analysis of the poppet valve 10 of the first embodiment; FIG. 8(b) of the poppet valve of JPA Laid Open No. H6-299816; and FIG. 8(c) of the poppet valve of Re-published patent WO 00/47876.

Due to the fact that the poppet valve of JPA Laid Open No. H6-299816 has a flat cap portion 16 as shown in FIG. 8(b), a combustion pressure as large as 545 MPa acts on the welded regions B of the cap portion 16 and the fillet portion 18 during a combustion process, which may cause fatigue fractures in the welded regions B. Moreover, the central part of the cap portion 16 is subjected to a pressure as large as 560 MPa, which may exceeds the strength of the cap portion 16 itself.

In the poppet valve of Re-published patent WO 00/47876, during a combustion process, a relatively large pressure as large as 117 MPa acts on the welded regions of the cap portion 16 and the fillet portion 18, and a pressure as large as 100 MPa acts on the region near the seat-abutment portion 19 of the fillet portion 18. Although the fillet portion 18 can be strengthened by work-hardening it, the welded regions B of the cap portion 16 and the fillet portion 18 can fracture under repetitive stresses (as large as 117 MPa) that acts on the areas near the welded regions B.

On the other hand, only a very small combustion pressure as much as 4 MPa acts on the welded regions of the cap portion 16 and the fillet portion 18 during a combustion process due to the fact that the entire region including the cap portion 16 and the fillet portion 18 of the poppet valve 10 of the first embodiment has high rigidity (mechanical strength). A comparatively high pressure as large as 157 MPa acts on the region of the seat-abutment portion 19 in abutment with the valve abutment face (valve seat) of a cylinder. This stress, however, can be dealt with by hardening the fillet portion 18. Although the cap member 17 is laser-beam-welded to the open end (i.e. seat-abutment portion 19) of the fillet portion 18 in the first through fourth embodiments, it should be understood that the cap member 17 may be alternatively electron-beam-welded. An electron beam welding excels laser beam welding in that the former welding generates less welding heat and hence less influence (e.g. structural softening) on the metallic material used. However, electron beam welding requires a vacuum welding environment, while laser beam welding does not. Thus, laser beam welding has a better productivity than electron beam welding. It is, therefore, preferable to employ electron beam welding in manufacturing poppet valves that require reliability and/or durability against a large load, but employ laser-beam welding when poppet productivity is important.

It has been described above that in the hollow poppet valves 10, 10A, 10B, and 10C in accordance with the respective first through fourth embodiments, the seat-abutment portions 19 are inclined at about 45 degrees with respect to the axes of the respective stem portions 12. However, the angle of inclination of the seat-abutment portions 19 is not limited to 45 degrees. In fact, it can be arbitrary within the range of 25-45 degrees in association with the inclination of the valve abutment face (i.e. valve seat) formed on an engine cylinder.

Although the hollow poppet valves 10, 10A, 10B, and 10C of the first through fourth embodiments are not charged with a coolant, they can be loaded with a predetermined amount of coolant such as sodium, potassium, or water to facilitate cooling of the poppet valve.

The invention claimed is:

1. A hollow poppet valve for use with an internal-combustion engine, the hollow poppet valve including: a stem portion provided at one end thereof with a closed tip portion; a cap portion for receiving combustion pressure, the cap portion consisting of a generally disk-shaped member; and a flared fillet portion integrated with the stem portion to form a thin hollow cylindrical member and welded to the cap member to serve as a transitional region between the stem portion and the cap portion, the thin hollow poppet valve characterized in that:
the thin hollow cylindrical member, drawn from a metal plate, has a thickness not more than the initial thickness of the metal plate;
the cap member has
a thickness substantially equal to the maximum thickness of the fillet portion,
a generally arcuate axial cross section, and
a tapered outer peripheral face;

the fillet portion is provided near the open end thereof with a seat-abutment portion having a tapered inner peripheral face to be mated with, and laser-beam-welded or electron-beam-welded to, the tapered outer peripheral face of the cap member; and an extruded weld bead is formed along the inner periphery of the mated faces of the cap member and the fillet portion.

2. The hollow poppet valve according to claim 1, wherein the thickness of the cap member gradually increases with the radius thereof.

3. The hollow poppet valve according to claim 2, wherein the seat-abutment portion and the cap member are welded together by means of a laser/electron beam directed along the interface of the mated faces of the seat-abutment portion and cap member and a little offset from the interface into the cap member.

4. The hollow poppet valve according to claim 3, wherein the cap member has a circular planar portion which is formed along the backside outer periphery thereof and perpendicular to the axis of the stem portion.

5. The hollow poppet valve according to claim 4, wherein the fillet portion, stem portion, and tip portion of the thin hollow cylindrical member are integrally formed.

6. The hollow poppet valve according to claim 4, wherein:
the fillet portion and the stem portion of thin hollow cylindrical member are integrally formed; and
a disk-shaped tip portion is welded to the open end of the stem portion.

7. The hollow poppet valve according to claim 4, wherein:
the fillet portion and a part of the stem portion of the thin hollow cylindrical member are integrally formed; and
a solid member is jointed to the open end of said part of the stem portion to serve as the remaining portion of the stem portion and as the tip portion.

8. A method of manufacturing a hollow poppet valve for use with an internal combustion engine, the hollow poppet valve including: a stem portion provided at one end thereof with a closed tip portion; a cap portion for receiving combustion pressure, the cap portion consisting of a generally disk-shaped member; and a flared fillet portion integrated with the stem portion to form a thin hollow cylindrical member and welded to the cap member to serve as a transitional region between the stem portion and the cap portion, the method characterized by comprising steps of:

drawing a metal plate into a thin hollow cylindrical member of a thickness not more than the initial thickness of the metal plate such that the thin hollow cylindrical member has a seat-abutment portion near the peripheral open end of the fillet portion;

forming a cap member having
a thickness substantially equal to the maximum thickness of the fillet portion,
an axially arcuate cross section, and
a tapered outer peripheral face to be mated with the tapered inner peripheral face of the seat-abutment portion;

mating the tapered outer peripheral face of the cap member to the tapered inner peripheral face of the seat-abutment portion; and laser-beam welding or electron-beam welding the mated faces so as to form an extruded weld bead along the inner periphery of the mated faces.

\* \* \* \* \*